UNITED STATES PATENT OFFICE.

KONSTANTIN TARASSOFF, OF MOSCOW, RUSSIA.

PROCESS FOR THE MANUFACTURE OF HARD COMPOSITIONS OF MATTER FROM ALDEHYDES AND PHENOLS.

1,216,516.     Specification of Letters Patent.     Patented Feb. 20, 1917.

No Drawing.     Application filed May 7, 1914. Serial No. 836,956.

*To all whom it may concern:*

Be it known that I, KONSTANTIN TARASSOFF, a subject of the Czar of Russia, and residing at No. 4 Dobroslobodsky Per Rasgulay, Moscow, Russia, have invented a certain new and useful Improved Process for the Manufacture of Hard Compositions of Matter from Aldehydes and Phenols, of which the following is a specification.

This invention relates to the production of hard compositions of matter from aldehydes and their derivatives and phenols.

As is known, the hard products obtained by the reactions of phenols with formaldehyde are employed in industry either in the ordinary state, or in mechanical admixture with different mineral and organic materials, which do not combine chemically with the product but serve merely some more or less mechanical function as filling agents, etc. The applicant has found and has pointed out in his prior applications that certain organic sulfo-acids and sulfonated products, as aromatic sulfo fatty acids, sulfo-acids obtained in the treatment of minerals and other hydrocarbon oils with sulfuric acid, as well as sulfonated fats of different kinds and fatty acids from various oils and fats, possess the property of taking part in the reactions between aldehydes and phenols, with the formation of new reaction products, in which the primary materials are in a state of chemical combination and not simply in mechanical admixture.

Hitherto, hard and perfectly homogeneous products have not been obtained with organic bodies containing no aldehyde, phenol or sulfo-groups, or with materials containing only such a small quantity of bodies containing these groups as to have no influence on the reaction. To such bodies belong, for example, coal- and wood-tar and their distillates, terpenes and derivatives, such as turpentine oil and like hydrocarbons and related substances, and other readily obtainable materials from which hard reaction products are likely to find application in commerce and technology, such products being in the claims referred to generically as organic bodies containing substantially no aldehyde, phenol or sulfo-groups.

The applicant has found that such substances will yield hard reaction products with phenols and aldehydes, their derivatives and the like, if the reactions concerned are brought about in the presence of sulfo derivatives like those already mentioned which in the claims are referred to generically as organic sulfo-products, and which not only themselves become constituents of the final products, but also favor the introduction into the latter of various substances which would be inert in the absence of such accelerating agents.

Under suitable conditions, as, for example, those discussed below, hard and completely homogeneous masses can be prepared from a mixture of phenols, aldehydes and sulfo-derivatives with coal and wood tar, turpentine oil, and the like products, colophony, resin oils, fatty oils, fatty and naphthenic acids, *i. e.* acids contained in crude petroleum and its distillates, as well as with the by-products obtained in the acid purification of mineral oils and their distillates and acid sludge. All these substances undergo a change during the process and in entering as a constituent part into the end product completely lose their individual characteristics and cannot be separated in any of the known ways in use for the recovery of constituents from mixtures and solutions. Thus, for example, turpentine oil soluble in ether and benzol cannot be extracted at all by means of these solvents and gas tar only to a very slight degree. It is hardly to be expected that the chemically different compounds existing in gas tar would all have the property of reacting with phenols and aldehydes. Those constituents which do not possess this property pass into the insoluble reaction products to form what may be compared with solid solutions. The reactions are accompanied by a different heat effect and proceed with different proportions of the phenols and aldehydes than reactions which are carried out without the addition of such substances as those mentioned.

By the introduction of these substances the properties of the products obtained can be varied at will, for example, according to the conditions of reaction and the nature and relative quantities of the various materials taken, products are obtainable which differ one from another in many respects, as in the matter of hardness, degree of elasticity, power of resistance to mechanical, physical and chemical agents, solubility in different solvents, fusibility, and in other properties. They may be readily worked with mechanical instruments and require for working up into objects no complicated apparatus.

Those final products which do not melt but which undergo decomposition at high temperatures, may nevertheless be molded as desired if for this purpose they are worked, in the intermediate phase when the reaction is not yet completed and the product remains fluid for some time. When poured into molds the fluid mass congeals, slowly in the cold, more quickly with application of heat, and passes into the solid final phase of the reaction, while retaining the shape of the mold employed.

The following are examples of some modes of procedure which may be employed in carrying out the invention:

Example 1.

50 grams of formalin (40 per cent.) are added to 100 grams of commercial carbolic acid, 50 grams acids from cocoa-nut oil and 15 grams of a 45 per cent. aqueous solution of naphtha sulfo-acids, obtained, for example, in sulfonating vaseline oil distillates from crude Russian petroleum, and the mixture is heated until ebullition commences. As soon as boiling ceases, the mixture is carefully agitated or stirred and is warmed on the water-bath until the loss by evaporation amounts to about 55 grams of the total weight of the materials taken for the reaction. The mixture is then cooled down to 35°–45° and a further addition of 40 grams of formalin is made with stirring of the mass. There results a completely homogeneous, not very viscid oily product, which is allowed to stand, with periodical stirring, at ordinary temperature until it has become fairly viscid, but has not lost the capability of flowing from the containing vessel, and is then poured into open or air-tight closed molds, or simply into a beaker, and left to stand for 10 to 12 hours. It is then heated on the water-bath for about half-an-hour to 75°, then to 90° and finally the completely solidified mass is heated in boiling water. About 200 grams of a yellow or light rose colored, hard, infusible product is obtained which is quite homogeneous and is devoid of cracks and bubbles.

Example 2.

200 grams commercial carbolic acid, 100 grams of Russian turpentine oil, 100 grams sulfo-acids obtained in the treatment of petroleum with sulfuric acid (45 per cent. strength) and 135 grams of formalin are carefully mixed until, through self-heating of the mass, brisk ebullition ensues. When the latter has ceased, the mixture is carefully stirred and allowed to stand for some time. There collects on the surface of the resulting resinous product an aqueous layer which is decanted. The residue is heated on the water-bath until the total loss of weight, including the weight of the decanted liquid, amounts to about 170 grams. The resinous fluid mass is then cooled down, with periodical agitation or stirring to 35° to 45° and is further mixed with 125 grams of formalin. A fluid, completely homogeneous mass results, notwithstanding that water has been introduced with the formalin. Since no separation of this water is observed during the later operations,—which may be carried out as described in the first example,—it is presumable that the water unites with the reaction-product, that is to say, the process in the second stage is accompanied by absorption of water. The same phenomenon is apparently also to be observed in other cases.

By this method of procedure about 450 grams of a very hard, infusible, light gray material is obtained.

Example 3.

100 grams of carbolic acid (95 to 98 per cent.), 50 grams of fluid, acid-free petroleum, by-products, obtained in the purification of petroleum by means of sulfuric acid, 50 grams sulfo aromatic acids, such as are known in commerce as "splitting reagents," and 35 grams of formalin (40 per cent.) are submitted to the same treatment as that described in Example 1, with the difference that in the first phase (i. e. to the addition of the second portion of formalin, of which 60 grams may be taken) about 45 grams of water are removed, partly by decantation and partly through evaporation. The product finally obtained consists of about 215 grams of a homogeneous hard, yellowish and infusible mass.

Example 4.

A mixture of 100 grams commercial carbolic acid, 100 grams wood- or coal-tar, 50 grams "splitting agent," and 50 grams of formalin are submitted to the action of heat as in the foregoing examples and, after elimination of 40–50 grams of water, etc., by decantation and evaporation, 65 to 75 grams more formalin are added, the usual precautions being observed. For the conversion of the reaction product into the solid state it is, after sufficiently long standing at ordinary temperature, warmed successively to 75°, 90° and 100°, as is mentioned, for instance, in Example 1. A yield of 305–310 grams of a highly compact, hard and perfectly homogeneous mass is obtained.

Example 5.

A mixture of 200 grams commercial carbolic acid, 100 grams Russian turpentine oil, 245 grams of formalin (40 per cent) and 20 grams of 45 per cent. sulfo-acids from the vaseline oil distillates of petroleum is submitted to heat until the resinous substance which separates out during ebullition solidifies on cooling to a hard product. The latter is then carefully washed with boiling water. The hard resinous product, of which about 350 grams are obtained, takes a good polish, melts without decomposition and is easily soluble in alcohol.

The substances employed according to this invention can be used in the form of variously constituted mixtures, provided that a given mixture comprises a sulfonated body or bodies, such as those already mentioned, since the presence of this class of substance among the initial materials taken for the preparation of the product is an indispensable condition of the process of the present invention.

I claim—

1. The herein described process which comprises condensing a mixture of formaldehyde, a phenol and organic bodies containing substantially no aldehyde, phenol or sulfo groups in the presence of an organic sulfo product.

2. The process which comprises condensing a mixture of formaldehyde, a phenol and organic bodies containing substantially no aldehyde, phenol or sulfo groups in the presence of a sulfo product derived from a fat.

3. The process which comprises condensing a mixture of formaldehyde, a phenol and organic bodies containing substantially no aldehyde, phenol or sulfo groups in the presence of organic sulfo acids.

4. The process which comprises condensing a mixture of formaldehyde, a phenol and organic bodies containing substantially no aldehyde, phenol or sulfo groups in the presence of a sulfo fatty acid.

5. The process which comprises condensing a mixture of formaldehyde, a phenol and organic bodies containing substantially no aldehyde, phenol or sulfo groups in the presence of an aromatic sulfo fatty acid.

6. The process which comprises condensing a mixture of an aldehyde, a phenol and a product obtained by the distillation of wood, in the presence of an organic sulfo acid.

7. The process which comprises condensing a mixture of an aldehyde, a phenol and Russian turpentine oil in the presence of an organic sulfo acid.

8. The process which comprises condensing a mixture of an aldehyde, a phenol and Russian turpentine oil in the presence of a sulfo fatty acid.

9. The process which comprises mixing together commercial carbolic acid, an organic body containing substantially no aldehyde, phenol or sulfo groups, formalin and an organic sulfo acid and causing condensation between the constituents to take place.

10. The process which comprises mixing together commercial carbolic acid, a product obtained by the distillation of wood, formalin and an organic sulfo acid and causing condensation between the constituents to take place.

11. The process which comprises mixing together commercial carbolic acid, a terpene product, formalin and an organic sulfo acid; and causing condensation between the constituents to take place.

12. The process which comprises mixing together commercial carbolic acid, Russian turpentine oil, formalin and an organic sulfo acid; and causing condensation between the constituents to take place.

13. The process which comprises causing condensation between commercial carbolic acid and formalin in the presence of an organic body containing substantially no aldehyde, phenol or sulfo groups, and a sulfo fatty acid.

14. The process which comprises causing condensation between commercial carbolic acid and formalin in the presence of a product obtained by the distillation of wood, and a sulfo fatty acid.

15. The process which comprises causing condensation between commercial carbolic acid and formalin in the presence of a terpene product and a sulfo fatty acid.

16. The process which comprises causing condensation between commercial carbolic acid and formalin in the presence of Russian turpentine oil and a sulfo fatty acid.

In testimony whereof I have signed my name to this specification in the presence of two subscribing witnesses.

KONSTANTIN TARASSOFF.

Witnesses:
 NIKOLAI ALEXELFT,
 CHRISTIAN ERFURT.